United States Patent
Hong et al.

(10) Patent No.: US 10,235,596 B2
(45) Date of Patent: Mar. 19, 2019

(54) SYSTEM AND METHOD FOR TRANSFERRING DATA USING IMAGE CODE, OUTPUTTING IMAGE CODE ON DISPLAY DEVICE, AND DECODING IMAGE CODE

(71) Applicant: Research & Business Foundation SUNGKYUNKWAN UNIVERSITY, Suwon-si (KR)

(72) Inventors: Kwang-Seok Hong, Gwacheon-si (KR); Kyung-Won Chang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 79 days.

(21) Appl. No.: 14/533,322

(22) Filed: Nov. 5, 2014

(65) Prior Publication Data

US 2015/0123987 A1  May 7, 2015

(30) Foreign Application Priority Data

Nov. 6, 2013  (KR) .......................... 10-2013-0133882
Apr. 3, 2014   (KR) .......................... 10-2014-0039826

(51) Int. Cl.
  *G06K 9/00*  (2006.01)
  *G06F 3/00*  (2006.01)
  (Continued)

(52) U.S. Cl.
  CPC ............ *G06K 9/4661* (2013.01); *G06F 3/14* (2013.01); *G09G 2370/02* (2013.01); *G09G 2370/18* (2013.01)

(58) Field of Classification Search
  CPC ............. G09G 2320/0666; G09G 5/02; G09G 2320/0693; G09G 2320/0626;
  (Continued)

(56) References Cited

U.S. PATENT DOCUMENTS

2003/0115591 A1* 6/2003 Weissmueller, Jr. ........................ G06Q 30/0241 725/22
2005/0001033 A1* 1/2005 Cheong ................. G06T 1/0021 235/454

(Continued)

FOREIGN PATENT DOCUMENTS

| JP | 2001-195536 A | 7/2001 |
| KR | 10-2009-0050731 A | 5/2009 |
| KR | 10-2012-0020892 A | 3/2012 |

OTHER PUBLICATIONS

Korean Office Action dated Nov. 23, 2014 in counterpart Korean Patent Application No. 10-2013-0133882 (4 pages, in Korean).

*Primary Examiner* — Hai Tao Sun

(74) *Attorney, Agent, or Firm* — NSIP Law

(57) ABSTRACT

Provided are a system for transferring data using an image code, a method of outputting an image code on a display device, and a method of decoding an image code. The system includes a code generation device configured to generate an image code including a series of brightness values corresponding to a binary code representing source data or a part of the binary code, a display device configured to output at least one color having the series of brightness values in a code area on a display panel in order of the series of brightness values, and a code decoding device configured to acquire the series of brightness values of the at least one color output in the code area through a sensor and to decode the image code.

28 Claims, 15 Drawing Sheets

(51) Int. Cl.
*G06K 9/46* (2006.01)
*G06F 3/14* (2006.01)

(58) Field of Classification Search
CPC ........... G09G 2360/145; G09G 3/3413; H04N 9/643; H04N 1/6027; H04N 9/3194; G01J 3/462; G01J 3/463; G01J 3/506
USPC ........................................................ 345/593
See application file for complete search history.

(56) References Cited

U.S. PATENT DOCUMENTS

| | | | |
|---|---|---|---|
| 2006/0091215 A1* | 5/2006 | Uchiyama | G06K 19/06037 235/462.1 |
| 2009/0073267 A1* | 3/2009 | Denoue | G06F 3/0325 348/207.1 |
| 2010/0275010 A1* | 10/2010 | Ghirardi | G06F 21/35 713/155 |
| 2011/0134332 A1* | 6/2011 | Jaynes | G09G 3/3611 348/708 |
| 2012/0051582 A1* | 3/2012 | Das Gupta | H04N 1/32224 382/100 |
| 2013/0027721 A1* | 1/2013 | Kobayashi | H04N 1/6033 358/1.9 |

* cited by examiner

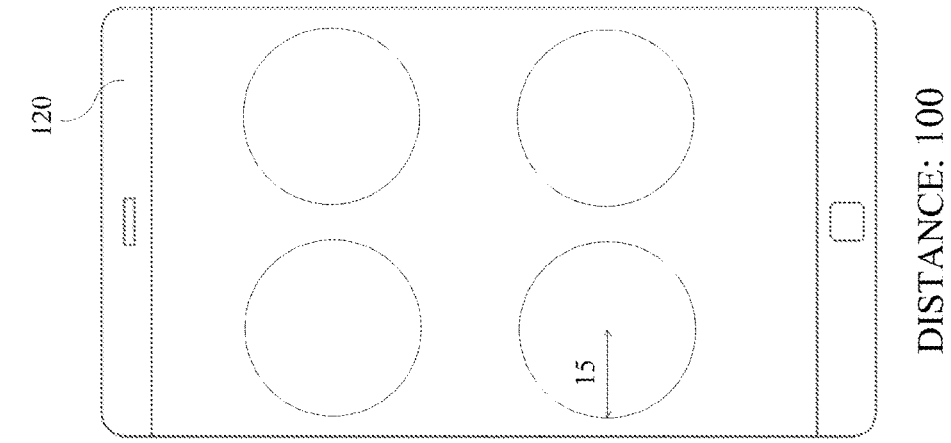
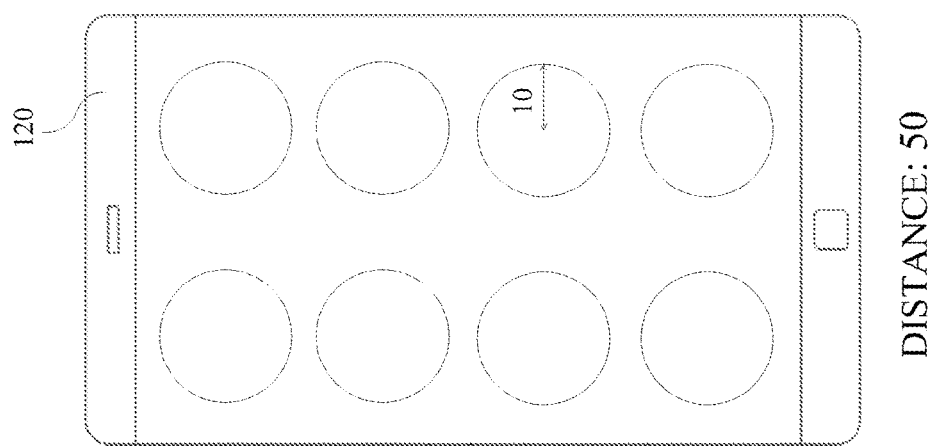
FIG. 6

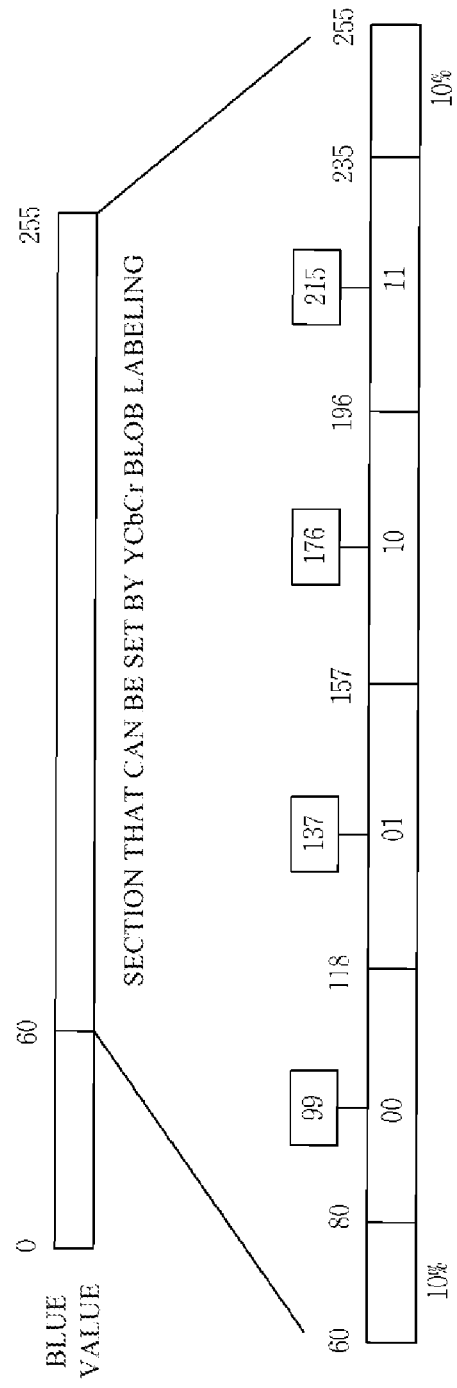

SYSTEM AND METHOD FOR TRANSFERRING DATA USING IMAGE CODE, OUTPUTTING IMAGE CODE ON DISPLAY DEVICE, AND DECODING IMAGE CODE

CROSS-REFERENCE TO RELATED APPLICATION

This application claims the benefit under 35 USC 119(a) of Korean Patent Application No. 10-2013-0133882, filed on Nov. 6, 2013 and Korean Patent Application No. 10-2014-0039826, filed on Apr. 3, 2014 in the Korean Intellectual Property Office, the entire disclosure of which is incorporated herein by reference for all purposes.

BACKGROUND

1. Field

The following description relates to a system for transferring specific data from a display device to a decoding device including a camera using an image code, and to a system for transferring data using an image code, a method of outputting an image code on a display device, and a method of decoding an image code.

2. Discussion of Related Art

In the field of digital data transfer, a wireless communication scheme using a radio frequency (RF) is attracting attention. Research is under way to replace the RF communication scheme with other communication schemes. One communication schemes for replacing the RF communication scheme includes a visible light communication scheme using a light-emitting diode (LED) device and receiver.

An LED-based visible light communication scheme for replacing the existing RF communication scheme is able to express only one bit at a time by the flashing white light, and additionally requires a light emitter and receiver. In addition, there has been recent attempt to recognize colors displayed in a display device as specific data. However, the attempt is intended to match one color to specific data, and thus it is difficult to express a large amount of data using limited colors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system for transferring data using an image code, including a code generation device configured to generate an image code comprising a series of brightness values corresponding to a binary code representing source data or a part of the binary code, a display device configured to output at least one color having the series of brightness values in a code area on a display panel in order of the series of brightness values, and a code decoding device configured to acquire the series of brightness values of the at least one color output in the code area through a sensor, and to decode the image code.

The code generation device may include an interface configured to accept the source data, a storage configured to store an encoding table comprising the series of brightness values corresponding to the binary code representing the source data or the part of the binary code, and a code generator configured to convert the source data into the series of brightness values using the encoding table, and the code decoding device may include the sensor configured to receive an input of a screen output on the display device, a storage configured to store a decoding table comprising the series of brightness values corresponding to the binary code representing the source data or the part of the binary code, and a code decoder configured to decode the image code expressed as the color output in the code area and having the series of brightness values using the decoding table.

The image code may include at least one color value and a brightness value of the color value, and a value obtained by combining the color value and the brightness value of the color value corresponds to the binary code or the part of the binary code.

The code area may be a whole display area on the display panel or at least one of a plurality of non-overlapping areas in the whole display area.

The source data may be at least one of text data, sound data, voice data, image data, or video data.

A size of the code area may be in inverse proportion to a distance D between the display device and the sensor.

The code decoding device may calculate the distance D using an equation below and transfers the calculated distance D to the display device, or the code generation device or the display device receives image information acquired by the sensor and calculates the distance D using the equation below:

$$D = \frac{W_c}{W_r} \times \frac{W_p}{2 \times \tan(FOV/2)}$$

where $W_c$ is an actual length of the display device or a part of the display device in one direction, $W_r$ is a pixel length of an image of the display device or the part of the display device corresponding to $W_c$ in an image acquired through the sensor, $W_p$ is a pixel length of the whole image acquired through the sensor in the same direction as the one direction, and FOV is a field of view of the sensor.

The display device may output the at least one color in a plurality of code areas, and outputs a reference brightness value of the at least one color in at least one of the plurality of code areas.

The code decoding device may decode the image code by comparing a brightness value of the at least one code area in which the reference brightness value is output with brightness values of the color output in other code areas.

The code decoding device may determine the series of brightness values of the at least one color using at least one of a red, green, blue (RGB) model, a YCbCr model, or a YCgCo model, and decodes the image code by analyzing the series of brightness values of the at least one color acquired through the sensor and constituting the image code and determining the binary code corresponding to the series of brightness values.

The code decoding device may determine the series of brightness values of the at least one color using at least one channel among Cb or Cr channels of the YCbCr model and Cg or Co channels of the YCgCo model.

The code generation device may generate the source data for user authentication in a form of the image code, and the code decoding device may decode the image code output by the display device, and performs authentication by comparing the decoded image code with previously stored user authentication data.

The system may include a communication device configured to transfer the image code decoded by the code decoding device to a remote server.

The sensor may be a camera.

The image code may include an at least one color value and a brightness value of the color value, and a value obtained by combining the color value and the brightness value of the color value may correspond to the binary code or the part of the binary code.

The code area may be a plurality of areas not overlapping each other in a whole display area on the display panel, and sizes of the areas may be determined according to a distance between the display device and the camera.

In another general aspect, there is provided a method of outputting an image code on a display device, the method including receiving, by a computer device, an input of source data through an input interface device, selecting, by the computer device, at least one colors that can be output on the display device, determining, by the computer device, a series of brightness values of the selected color corresponding to a binary code representing the source data or a part of the binary code, and outputting, by the computer device, the selected color having the series of brightness values in a code area on a display panel of the display device in order of the series of brightness values.

A size of the code area may be determined according to a distance D between the display panel and the camera capturing a screen of the display panel.

The computer device may determine distance D using an image captured through the camera and an equation below:

$$D = \frac{W_c}{W_r} \times \frac{W_p}{2 \times \tan(FOV/2)}$$

where $W_c$ is an actual length of the display device or a part of the display device in one direction, $W_r$ is a pixel length of an image of the display device or the part of the display device corresponding to $W_c$ in the image acquired through the camera, $W_p$ is a pixel length of the whole image acquired through the camera in the same direction as the one direction, and FOV is a field of view of the camera.

In yet another general aspect, there is provided a method of decoding an image code, the method including outputting, by a display device, a color having a series of brightness values corresponding to a plurality of binary codes representing source data or some of the binary codes in a plurality of code areas on a display panel, acquiring, by a computer device, an output image of the display panel through a camera, determining, by the computer device, the series of brightness values of the color output in the plurality of code areas in the output image acquired through the camera in order of the plurality of code areas, determining, by the computer device, the plurality of binary codes or the some of the binary codes corresponding to the series of brightness values of the color output in the plurality of code areas, and decoding, by the computer device, the source data by combining the plurality of binary codes or the some of the binary codes.

The outputting of the color may include outputting, by the display device, a reference brightness value of the color in at least one of the plurality of code areas, and the determining of the series of brightness values comprises decoding, by the computer device, the image code by comparing a brightness value of the at least one code area in which the reference brightness value is output with brightness values of the color output in other code areas.

The determining of the series of brightness values may include determining, by the computer device, the series of brightness values of the color using at least one channel among of red, green, blue (RGB) channels of an RGB model, Cb and Cr channels of a YCbCr model, or Cg and Co channels of a YCgCo model.

The method may include outputting, by the display device, a sample image having different brightness values of the color before the outputting of the color, wherein the determining of the series of brightness values may include analyzing, by the computer device, the sample image output from the display device and determining the series of brightness values based on a color whose different brightness values are distinguished from each other, or analyzing, by the computer device, the sample image output from the display device to determine a color model whose different brightness values are distinguished from each other and determining the series of brightness values using the determined color model.

Other features and aspects will be apparent from the following detailed description, the drawings, and the claims.

BRIEF DESCRIPTION OF THE DRAWINGS

FIG. 6 is a diagram illustrating an example of code areas whose sizes are changed according to the distance between a display device and a camera.

FIG. 7 is a diagram illustrating an example of a decoding brightness value section used in a process of decoding an image code.

Figure 1:
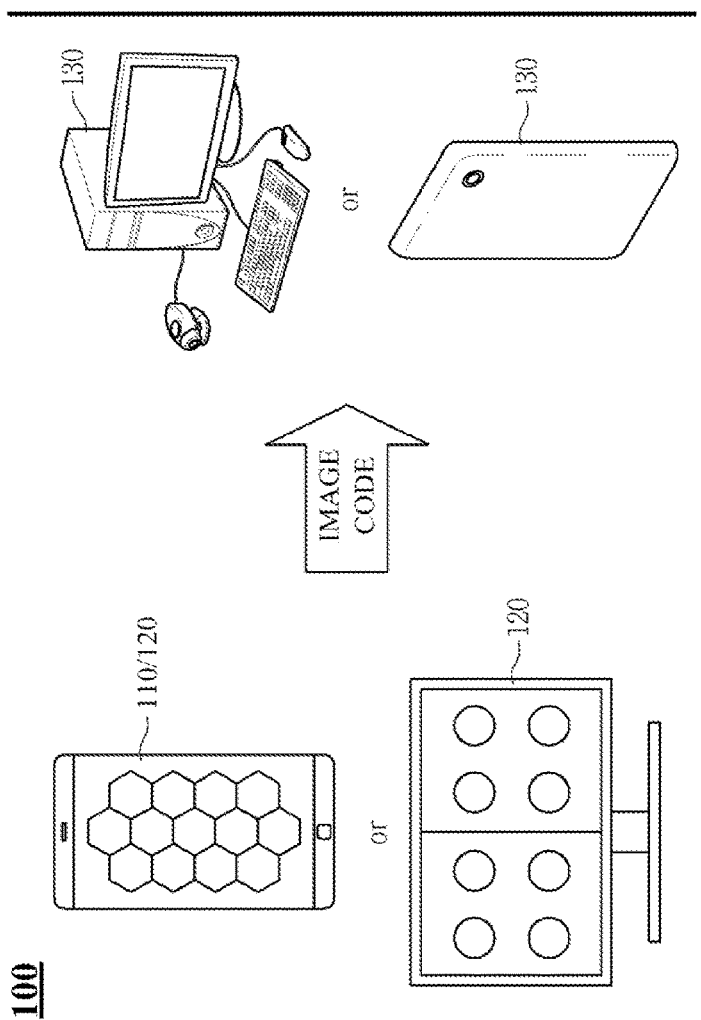
FIG. 1 is a diagram illustrating an example of transferring an image code in a system for transferring data using an image code.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In a computer device, data is expressed as a specific code, such as, for example, text data is expressed as unicode, and American standard code for information interchange (ASCII) code. A computer device recognizes an ASCII code, etc., as an array of binary numbers.

In the following description, a brightness value of a specific color output from a display device is used as a binary number expressed by an electric signal or a code expressed as a binary number in a computer device. In other words, it is possible to encode and decode specific data using brightness values. A code expressed as a binary number is referred to as a binary code.

In the following description, a separate receiving device including a camera decodes brightness values of a specific color encoded and output from a display device, and transfers specific data.

According to 8-bit ASCII codes, a letter "s" is expressed as "01110011." By defining in advance that a brightness value of a specific color corresponds to the binary number "01110011," it is possible to express the letter "s" using the one brightness value. The types of brightness values are as many as the number of letters that can be expressed as ASCII codes.

In addition, even by defining in advance that a specific brightness value corresponds to a binary number of some digits, it is possible to express a specific code. For example, it is possible to express a letter "s" as two-digit binary numbers "01," "11," "00," and "11." When brightness values of a specific color represent the two-digit binary numbers, it is possible to express text data with only four different brightness values.

It is following description may be used to transfer various data expressed as codes, such as, for example, binary numbers, octal numbers, decimal numbers, or hexadecimal numbers.

In the following descriptions, a display device outputs a color having a specific brightness value by encoding data to be transferred, and a decoding device including a camera decodes an image output from the display device. The data to be encoded is referred to as source data. Source data denotes all types of data expressed as digital data. Source data includes data, such as, for example, text data, image data, voice data, and video data. For convenience of description, source data is assumed to be text data, however, the present disclosure is equally applicable to any type of data described above.

As described above, source data can be expressed as a specific binary code. In the following descriptions, brightness values of a specific color correspond to specific binary codes, and source data can be eventually expressed as a series of brightness values. In this case, the source data is expressed as a sequential brightness value list. Further, when a plurality of colors are used, source data may also be expressed as a brightness value list of the plurality of colors.

A series of brightness values representing source data is referred to as an "image code."

When a two-digit binary code is expressed with one brightness value, four brightness values of one color may represent binary codes of "00," "01," "10," and "11." In the case of text data in ASCII codes, one letter may be expressed with four brightness values.

When two colors are used together with four brightness values of each color, it is possible to represent eight brightness values with three-digit binary codes. Even when a plurality of colors are used, source data is eventually expressed using a brightness value list of at least one color. When a plurality of colors are used, source data is expressed as a list of "information for identifying colors and brightness values." For convenience of description, it is assumed below that source data is expressed as an image code having a series of brightness values however, the present disclosure is equally applicable to any other expression of source data.

The following descriptions may be applied to codes other than binary codes, and there may be a variable number of used color values and a variable number of brightness values of each color value.

FIG. 1 is a diagram illustrating an example of transferring an image code in a system 100 for transferring data using an image code.

The system 100 for transferring data using an image code includes a code generation device 110 that generates the image code, a display device 120 that outputs the image code, and a code decoding device 130 that acquires the image code output from the display device 120 through a sensor, such as, for example, a camera, and decodes the image code.

The display device 120 includes a portable terminal, such as a smart phone, shown in the upper left of FIG. 1, and a device, such as a computer monitor, shown in the lower left of FIG. 1. As a non-exhaustive illustration only, a portable terminal described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein. A device having a built-in central processing unit (CPU) could include the code generation device 110 and the display device 120 in one device. The computer monitor is generally connected with a code generation device including a CPU, which is not depicted in the monitor displayed on the lower left portion of FIG. 1.

An image code or a part of the image code output on the screen of the display device 120 is shown in FIG. 1. The code decoding device 130, which is located at a predetermined distance from the display device, acquires the image code or the part of the image code output on the display panel of the display device 120 through the camera of the code decoding device 130. The code decoding device 130 may comprise a personal computer (PC) that is shown in the upper right of FIG. 1, and may acquire image data through a separate camera, a smart phone having a built-in camera, and so on.

The display device 120 and the code decoding device 130 may be located within a distance in which it is possible to decode a code image output from the display device 120. When the camera is connected to the code decoding device 130 or wirelessly exchanges data with the code decoding device 130, the distance in which it is possible to decode a code image is sufficient for the distance between the display device 120 and the camera. The distance in which it is possible to decode a code image is referred to as a "decodable distance." The decodable distance may depend on factors, such as, for example, the size of the display panel, performance of the display device 120, performance of the camera, and surroundings illumination in which an image code is output.

FIGS. 2A to 2C are diagrams illustrating examples of transferring data using an image code in a system for transferring data using an image code. FIG. 2A shows an example in which the code generation device 110 encodes source data into specific image codes, FIG. 2B shows an example in which the display device 120 outputs a part of the image codes, and FIG. 2C shows an example in which the code decoding device 130 decodes image codes acquired through the camera.

In FIGS. 2A-2C, it is assumed that source data is text data, and the text data is expressed as 8-bit ASCII codes. Referring to FIG. 2A, the code generation device 110 receives an input of text data "hello." "Hello" corresponds to ASCII codes "01101000 (h)," "01100101 (e)," "01101100 (l)," "01101100 (l)," and "01101111 (o)."

When the number of brightness values of a color constituting an image code is the number of ASCII codes or more, each of the ASCII codes may be matched to one brightness value in advance. However, it may be difficult for the decoding device 130 to identify as many brightness values as the number of ASCII codes. Therefore, in the descriptions below, it is assumed that brightness values represent two-digit binary numbers.

Referring to an encoding table shown in the code generation device 110 of FIGS. 2A and 7, "00" is expressed as a brightness value of 99, "01" is expressed as a brightness value of 137, "10" is expressed as a brightness value of 176, and "11" is expressed as a brightness value of 215.

The code generation device 110 determines a series of brightness values corresponding to binary codes representing the input source data using the encoding table. Since an 8-bit ASCII code represents one character with eight bits, one character may be expressed by four brightness values. In FIG. 2B, the display device 120 shows an example of displaying eight brightness values on one screen. Since the display device 120 of FIG. 2B displays two characters in one screen, it is possible to represent "hello" with three image frames. An area shown in FIG. 2B in which a color having specific brightness value is output is referred to as a "code area." And one of the code area depicted as "Reference" is used for displaying a reference brightness value. The reference brightness value should have a brightness value that is different with the brightness values indicating the binary code. The code decoding device 130 could distinguish the reference brightness value from the other value that correspond to the binary code. For example, the reference brightness value is a min value and/or a max value, which could be detected by the code decoding device 130. The reference brightness value could include one value or more values.

The shape and the size of a code area may be modified according to characteristics of the display device 120 or the surrounding in which image codes are transferred. The order in which a series of brightness values constituting an image code are output in code areas is set in advance. The order in which a series of brightness values of a color are output is shared between the display device 120 and the code decoding device 130.

The code decoding device 130 acquires an image code output by the display device 120 using the camera, and determines a series of brightness values constituting the image code. The display device 120 displays the series of brightness values in eight code areas. To accurately and rapidly acquire an image code from the display device 120, the code decoding device 130 may obtain information on the positions and the sizes of the code areas in advance. The code decoding device 130 may also process the image acquired through the camera to find the code areas distinguished with brightness values.

Further, a reference brightness value related to no image code may be output in at least one of the code areas depicted as "Reference" in FIG. 2B in which the display device 120 outputs brightness values. As the reference brightness value, a first reference brightness value that is the maximum brightness value detectable by a camera and a second reference brightness value that is the minimum brightness value detectable by a camera may be used.

The reference brightness value is preferable because a specific brightness value determined by the code generation device 110 may be interpreted as a brightness value other than the determined specific brightness value according to the illumination of an image output by the display device 120, performance of the display device 120, performance of the camera, and so on. When the reference brightness value is used, the code decoding device 130 determines a brightness value of a code area in which the reference brightness value is output in the image acquired through the camera. The brightness value of the reference brightness value in the camera image is referred to as a "comparative brightness value." In this case, the code decoding device 130 may consistently determine brightness values by comparing the comparative brightness value with brightness values of a color output in other code areas.

FIGS. 2A-2C show the concept of how image codes are encoded and decoded. Images codes shown in FIGS. 2A-2C are illustrative examples, various other codes representing text data may be used, and source data may not be text data.

According to the example of FIGS. 2A-2C, image codes are a set of binary codes representing "hello" or 8-bit binary codes representing one character. An image code may corresponds to entire source data, or may represents a meaningful part of the source data. When source data is not text data, an image code may be one image code divisible into pieces of data in predetermined time units. When source data is image data, a code representing one frame or a code representing a specific area of one frame may be an image code.

Meanwhile, although not shown in FIGS. 2A-2C, an image code may include information indicating the start and the end of the image code. For example, at least one code area having a brightness value of 60 may be a start header indicating the start of an image code, and at least one code area having a brightness value of 255 may be an end header indicating the end of the image code. In other examples, a start header and an end header may be defined as other brightness values that do not represent source data, or a combination of the other brightness values.

Figure 3:
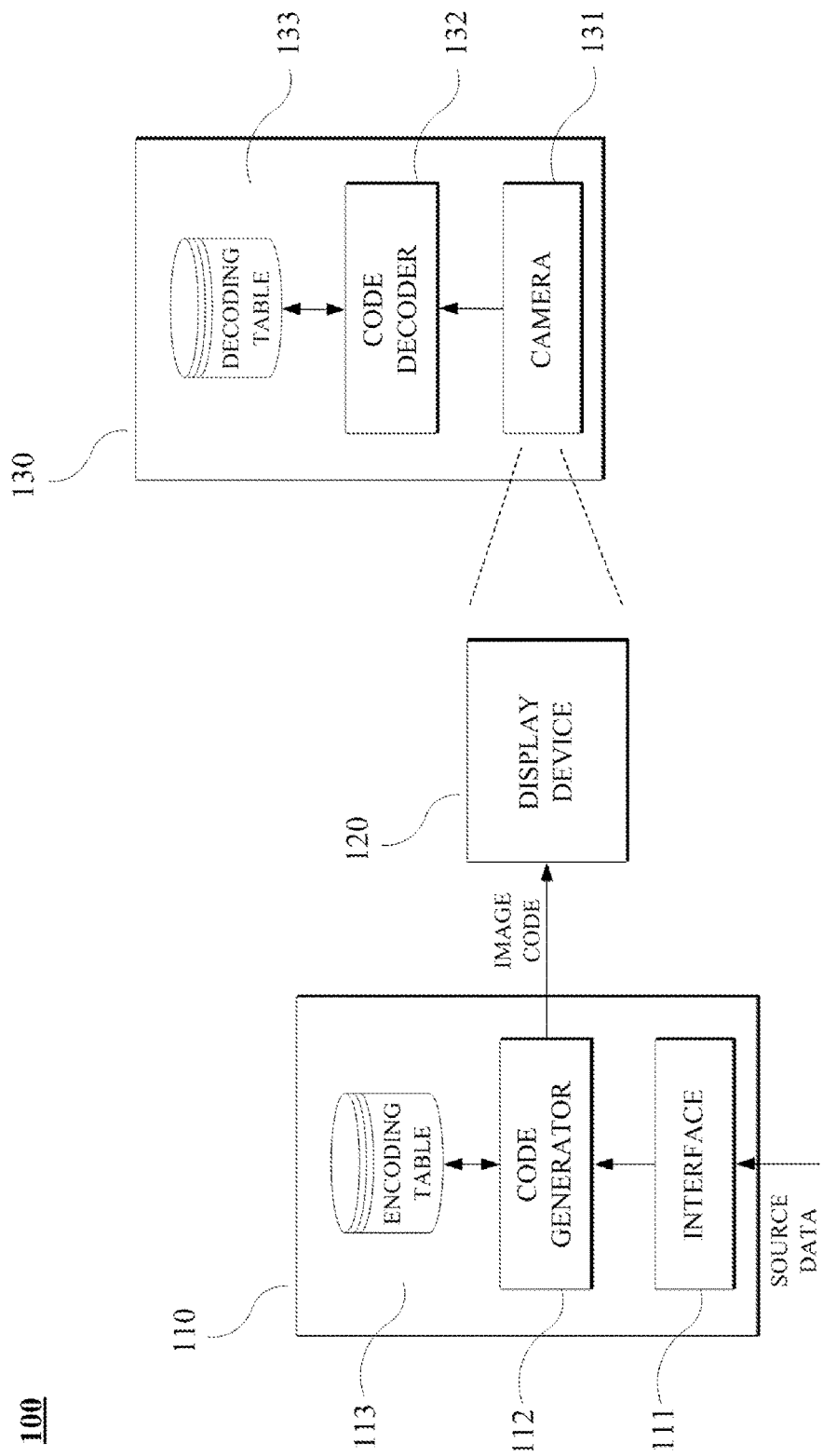
FIG. 3 is a diagram illustrating an example of a block diagram of a system for transferring data using an image code.

FIG. 3 is a diagram illustrating an example of a system for transferring data using an image code.

The system 100 for transferring data using an image code includes the code generation device 110, the display device 120, and the code decoding device 130. The code generation device 110 generates an image code including a series of brightness values corresponding to a binary code representing source data or a part of the binary code. The display device 120 outputs at least one color having the series of brightness values in code areas on a display panel in order of the series of brightness values. The code decoding device 130 acquires the series of brightness values of the at least one color output in the code areas through a camera and decodes the image code.

Source data may be input through an interface 111 of the code generation device 110. The interface 111 is not only a data input means connected to the code generation device 110 but also an interface that may receive an input of data stored in a storage medium, such as a Universal Serial Bus (USB) memory.

A code generator 112 refers to an encoding table stored in a storage 113, which is a storage medium such as a memory, to generate an image code corresponding to the input source data. For example, the encoding table may store ASCII codes representing text data and brightness values of a specific color corresponding to binary codes constituting the ASCII codes. A binary code denotes a code representing specific data with binary numbers. The code generator 112 corresponds to a calculation device such as, for example, a CPU, or a processor, which is capable of generating an image code or a series of brightness values constituting the image code from source data.

An image code generated by the code generation device 110 is transferred to the display device 120. The image code received by the display device 120 is an instruction to output a color with a brightness value at a specific position (code area) of the display panel. Although the code generation device 110 and the display device 120 are shown as different units in FIG. 3, the code generation device 110 and the display device 120 correspond to a single unit. For example, the code generation device 110 and the display device 120 may be implemented in one device, such as, for example, a smart phone, a PC, and as a computer and a monitor connected to the computer.

The code decoding device 130 acquires an image code output from the display device 120 located at a relatively close distance through a camera 131. A code decoder 132 analyzes an image acquired through the camera 131 to determine brightness values of a color output in the code areas, and decodes the image code using a decoding table 133 stored in a storage medium, such as, for example, a memory. The code decoder 132 determines brightness values of the code areas of the acquired image, and searches the decoding table 133 for the determined brightness values, thereby completing the corresponding binary code. For example, when each brightness value corresponds to a two-digit binary number as shown in FIGS. 2A-2C, text data is decoded by completing an 8-bit binary code indicated by four brightness values.

In addition, when a color having a reference brightness value is output in at least one of the plurality of code areas as described above, the code decoder 132 determines the above-mentioned comparative brightness value, and determines relative brightness values of a color output in the other code areas based on the comparative brightness value.

Figure 4:
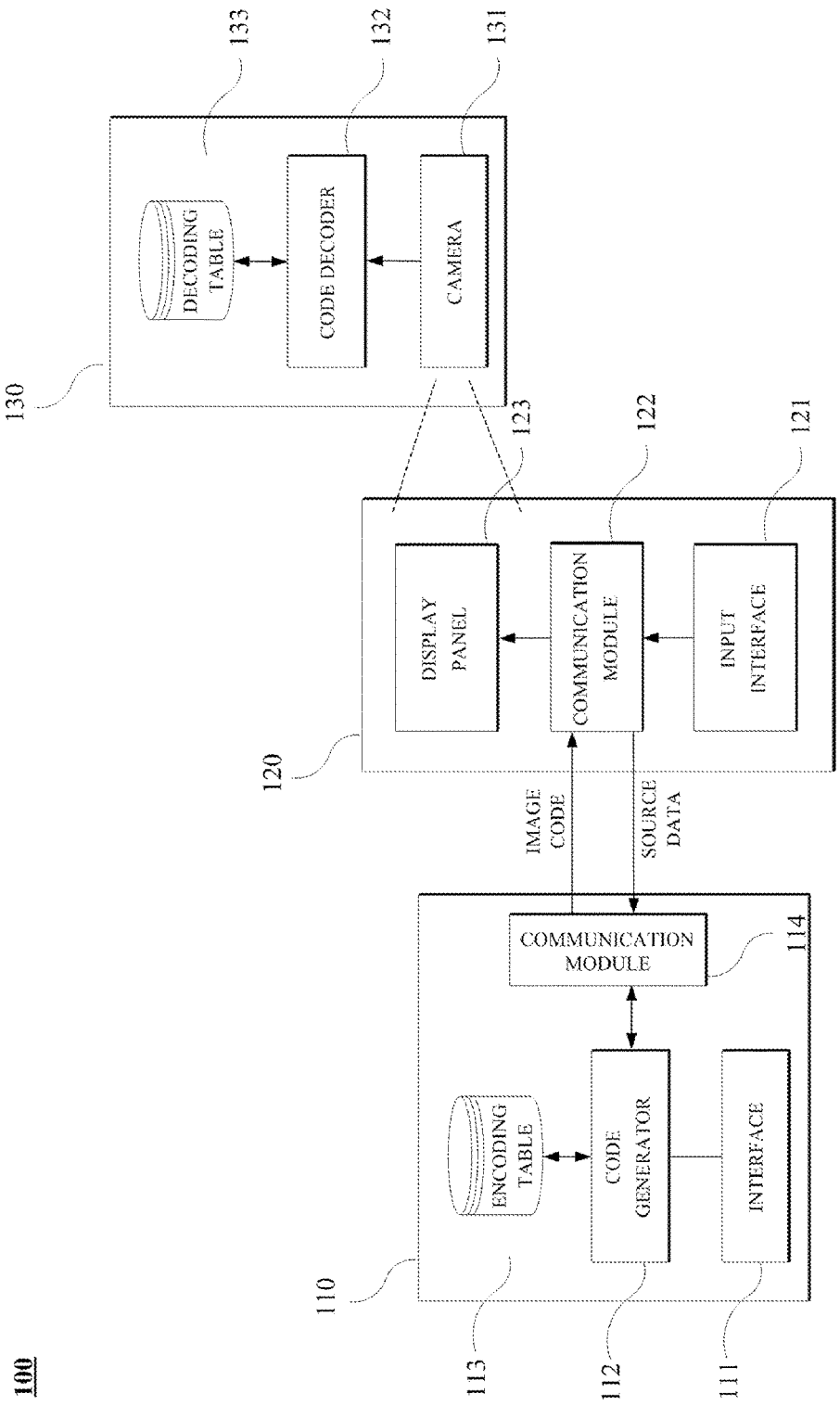
FIG. 4 is a diagram illustrating another example of a system for transferring data using an image code.

FIG. 4 is a diagram illustrating another example of a system for transferring data using an image code. The system 100 for transferring data using an image code shown in FIG. 4 differs from the system shown in FIG. 3 in that the code generation device 110 and the display device 120 are remotely located from each other. The above descriptions of FIG. 3, is also applicable to FIG. 4, and is incorporated herein by reference. Thus, the above description may not be repeated here.

Source data may be input through an input interface 121 of the display device 120. The input source data is transferred to a communication module 114 of the code generation device 110 at a remote place through a communication module 122. The code generator 112 of the code generation device 110 generates an image code from the source data received through the communication module 114. The code generation device 110 transfers the generated image code to the display device 120 through the communication module 114, and the display device 120 outputs a series of brightness values of a specific color in code areas on a display panel 123 with reference to the image code.

In another example, the source data may be input through the interface 111 of the code generation device 110 as shown in FIG. 3, and may not be transferred to the code generation device 110 through the display device 120.

To detect an area indicating a brightness value in an image input to the camera 131, the code decoding device 130 may use various algorithms for detecting the brightness value. Further, when screens output from a plurality of display devices 120 are detected, it is possible to perform n-to-1 communication.

Figure 2:
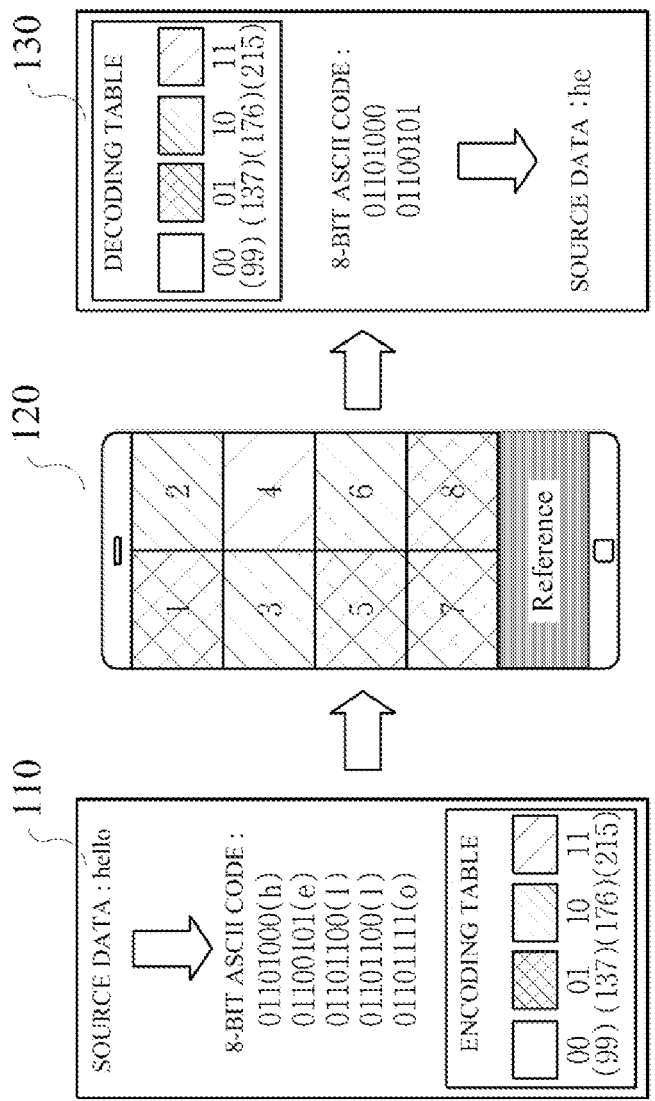
FIGS. 2A to 2C are diagrams illustrating examples of transferring data using an image code in a system for transferring data using an image code.

The image code generated by the code generation device 110 includes a series of brightness values of at least one color. Each brightness value corresponds to at least one of a binary number, a binary code, or a part of a binary code. In FIG. 2, an example in which one brightness value corresponds to a two-digit binary number or a part of a binary code has been described.

A binary code may be indicated by different brightness values of one determined color or a plurality of colors. For example, each blue and red color may be used with four brightness values. When two colors are used, it is possible to define eight binary codes or a part of a binary code with brightness values.

Eventually, it is possible to say that an image code represents source data with a combination of a plurality of brightness values of one color or a combination of a plurality of brightness values of each of a plurality of colors. When a plurality of colors are used, an image code is expressed as combinations of a color value of a color and a brightness value of the color value.

Variables related to a data transmission rate are the number of brightness values of one color, whether or not a plurality of colors are used, and the number of brightness values of a color output on one display screen. A speed at which source data is transmitted may be determined by mutual agreement between a transmitter and a receiver. When the source data transmission speed is determined by leaving a predetermined time interval between frames in consideration of a screen output rate of the display device 120 and an image input rate of the code decoding device 130, stable communication is possible.

An image code output from the display panel 123 of the display device 120 may be output in a code area having various sizes and shapes.

For example, a code area may be a whole display area on the display panel 123 or at least one of a plurality of areas that have a predetermined shape and do not overlap in the whole display area.

The whole display area denotes an entire screen on which it is possible to output an image. When a code area is the whole display area on the display panel 123, one color having a brightness value is output on one screen.

A plurality of areas located in the whole display area may be an example of dividing the whole display area equally or unequally and using all the divided display areas, or an example of using a part of the whole display area. In the example of using a part of the whole display area, the shapes of areas may be at least one of a circle, a regular polygon, and an irregular shape.

Figure 5C:
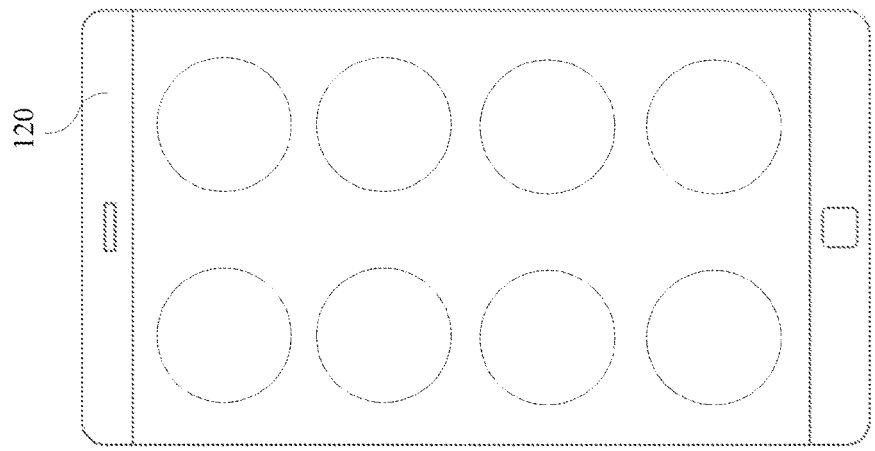
FIG. 5C is a diagram illustrating an example of code areas output on a display device having a circular shape.
Figure 5B:
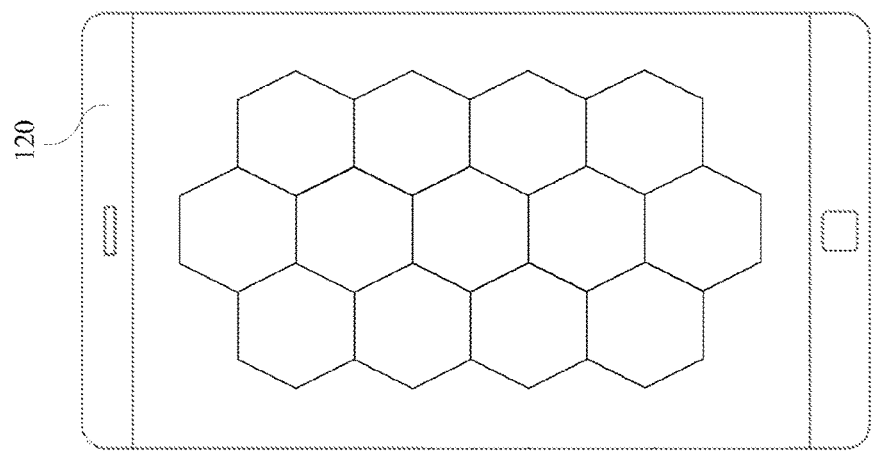
FIG. 5B is a diagram illustrating an example of code areas output on a display device having a hexagonal shape.
Figure 5A:
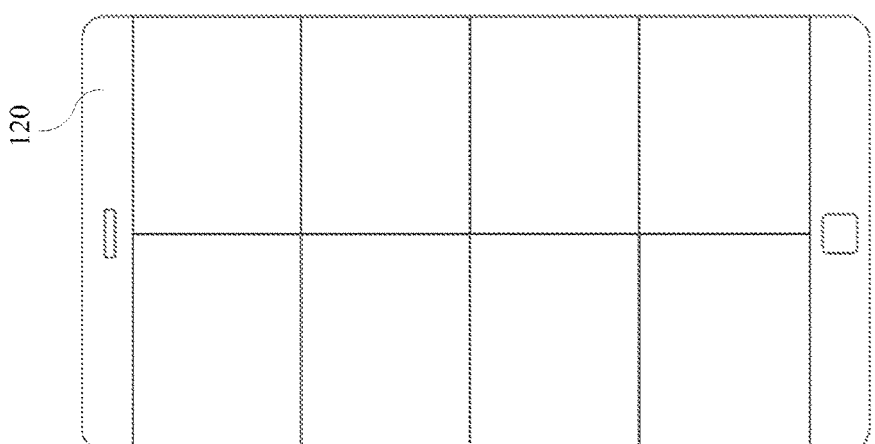
FIG. 5A is a diagram illustrating an example of code areas output on a display device obtained by dividing a whole display area on a display panel into quadrangles.

FIGS. 5A-5C illustrate examples of code areas output on a display device, in which FIG. 5A illustrates an example of code areas obtained by dividing a whole display area on a display panel into quadrangles, FIG. 5B illustrates an example of code areas having a hexagonal shape, and FIG. 5C illustrates an example of code areas having a circular shape.

FIG. 5A shows an example of code areas obtained by dividing the whole display screen of a display panel into quadrangles. FIGS. 5B and 5C are examples of using a part of the whole display screen of a display panel as code areas. The code areas shown in FIG. 5 are some examples, it is understood that those skilled in the art may include other example of code areas obtained by dividing the whole display screen of a display panel. Areas obtained by dividing the whole display screen may have different sizes, and areas obtained by dividing a part of the whole display screen may have different shapes or sizes. The positions and the sizes of code areas and the order in which a series of brightness values are output may be information shared in advance between the display device 120 and the code decoding device 130. In this case, the positions of code areas in which the series of brightness values are output may be changed automatically over time or according to a selection of a user. FIG. 2 shows serial numbers in code areas obtained by dividing a whole display screen. After a series of brightness values are initially output in order of numbers, the positions of the code areas in which a series of brightness values are output may be changed.

When a color having a reference brightness value is output in a code area from among a plurality of code areas, the code decoding device 130 compares a brightness value of the code area in which the reference brightness value is output with brightness values of a color output in other code areas and a series of brightness values acquired through the camera, thereby decoding an image code.

The size of a code area may be determined according to the distance between the display device 120 and the camera 131. FIG. 6 illustrates an example of a diagram where the size of code areas are changed according to the distance between a display device 120 and a camera 131.

In FIG. 6, when the distance between the display device 120 and the camera 131 is 50, eight code areas are output, and each code area has a circular shape having a radius of 10. Subsequently, when the distance between the display device 120 and the camera 131 becomes 100 but each code area still has the radius of 10, the sizes of code areas input to the camera 131 are reduced, and thus it may be difficult to determine brightness values. Therefore, the size of each code area may be increased in proportion to the distance between the display device 120 and the camera 131. FIG. 6 shows an example in which the radius of each code area is increased to 15 when the distance between the display device 120 and the camera 131 is increased to 100. When the size of each code area increases, the number of code areas that can be output in one screen may be reduced. In FIG. 6, units of distance and radius are not shown.

FIG. 6 is a just example of the number and the sizes of code areas output according to the distance between the display device 120 and the camera 131. The distance between the display device 120 and the camera 131, the number and the sizes of code areas may vary according to actual system performance, a setting of a user, and other factors. FIG. 6 shows an example of circular code areas, but code areas having other shapes may also be adjusted in size according to a predetermined reference, such as, for example, a distance from the center of mass and a one-directional length.

The code decoding device 130 may calculate a distance D using Equation 1 below and transfer the calculated distance D to the display device 120, or the code generation device 110. In another example, the display device 120 may receive image information acquired by a camera and calculate the distance D using Equation 1 below.

$$D = \frac{W_c}{W_r} \times \frac{W_p}{2 \times \tan(FOV/2)} \qquad \text{[Equation 1]}$$

$W_c$ is an actual one-directional length of a display device or a part of the display device, $W_r$ is a one-directional pixel length of an image of the display device or the part of the display device in the image acquired through a camera, $W_p$ is a pixel length in the same direction as one direction of the image acquired through the camera, and FOV is the field of view of the camera. For example, $W_r$ may be a horizontal-direction pixel length of the image occupied by the display device in the image acquired by the camera, and $W_p$ may be a horizontal-direction pixel length of the whole image acquired by the camera. $W_r$ and $W_p$ are lengths in the same direction in the image. When $W_r$ is a vertical-direction pixel length, $W_p$ also is a vertical-direction pixel length.

At least one of the display device 120 and the code decoding device 130 may measure illumination using an illumination sensor, and according to the measured illumination, the display device 120 may adjust the brightness or the color of an image output from the display device 120, or the code decoding device 130 may adjust the exposure of a lens of the camera 131.

As described above, an 8-bit ASCII code requires eight brightness values for one character when a brightness value represents one bit, and requires four brightness values when a brightness value represents two bits. Color values classified according to brightness values are expressed as specific values by a computer device or a display device according to a method of expressing colors.

For example, the code generation device 110 generates an image code having a brightness value of 99 corresponding to "00." The display device 120 outputs the color having the brightness value of 99 in a specific code area. However, based on illumination or hardware performance, it may be difficult for the code decoding device 130 to exactly determine that the brightness value output on the display device 120 is 99.

When a two-digit binary code is expressed with four brightness values, the code decoding device 130 may use four brightness value sections corresponding to the four brightness values. In other words, when the brightness value of a color output in a specific code area is included in a specific brightness value section, the code decoding device 130 interprets the brightness value as one brightness value representing the brightness value section. Such a brightness value section is referred to as a decoding brightness value section.

FIG. 7 illustrates an example of a decoding brightness value section used in a process of decoding an image code. An example of decoding brightness value sections corresponding to the brightness values shown in FIG. 2 is shown in FIG. 7.

A process of determining decoding brightness value sections and the number of the decoding brightness value sections involves using an algorithm to detect a color value output from the display device 120. Such an algorithm for detecting a color value may include, for example, a blob-labeling algorithm, a CAMSHIFT algorithm, and an adaptive boosting (AdaBoost) algorithm. For convenience of description, a blob-labeling algorithm based on the YCbCr color model is assumed to be used, however, the present disclosure is equally applicable to any algorithm for detecting a color value.

In FIG. 7, assuming that the code decoding device 130 efficiently detects brightness values constituting an image code when brightness values of a specific color is 60 to 255, only sections ranging from a brightness value of 60 to a brightness value of 255 are used. The range of a brightness value detected by the code decoding device 130 may vary according to various factors, such as, for example, colors, hardware performance of a display device and a camera, a brightness value detection environment, and a setting of a user.

In FIG. 7, there are $2^m$ decoding brightness value sections, where m denotes the number of bits expressed by one brightness value.

The section that have the brightness value 60 to 255 depicted in FIG. 7 is an example of an area that can be set by YCbCr blob labeling. At both ends of a section ranging from the brightness value of 60 to the brightness value of 255 are set as marginal sections for the reference brightness values. And the section remaining between the two marginal sections may be divided into four sections, which are set to indicate bits of 00, 01, 10, and 11, respectively. FIG. 7 is just an example of decoding brightness value sections, and various other sections are considered to be well within the scope of the present disclosure.

In a process in which the code decoding device 130 detects a color value, a color used by the code generation device 110 is not necessarily used. For example, when the code generation device 110 selects blue (B) color to generate a brightness value, the code decoding device 130 may identify a brightness value not based on a B value but based on a green (G) value for brightness value detection. A bright value difference in one color may be indicated by a bright value difference in another color, and in some cases, the code decoding device 130 may more accurately decode a brightness value based on another color and not based on a color output from the display device 120. The code decoding device 130 may determine a color for decoding an image code according to an illumination environment in which the image code is acquired, and hardware characteristics.

Figure 8A:
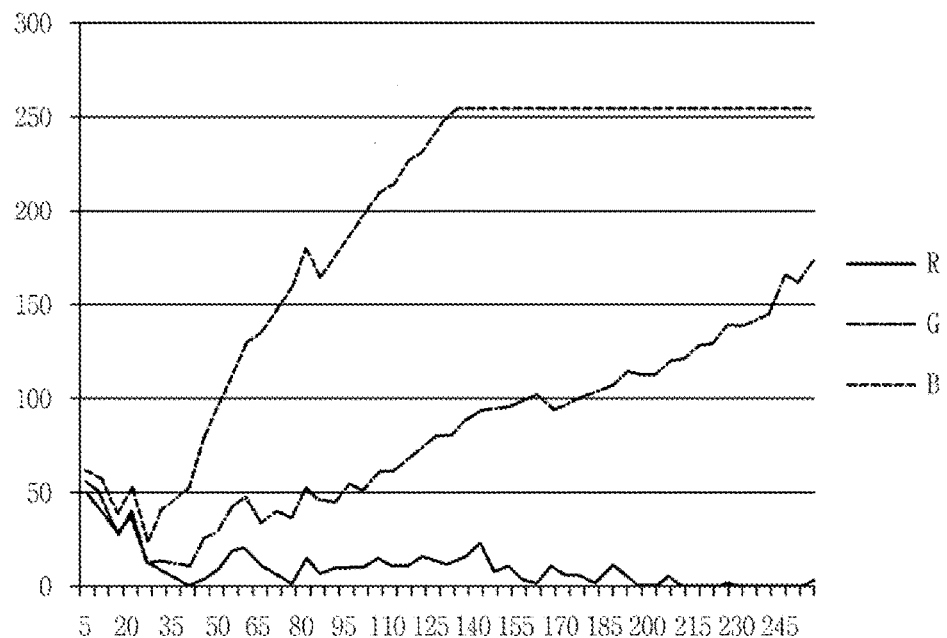
FIGS. 8A and 8B are diagrams illustrating examples of results that a decoding device receiving an image code of blue (B) color obtains by analyzing red, green, blue (RGB) values according to distance.
Figure 8B:
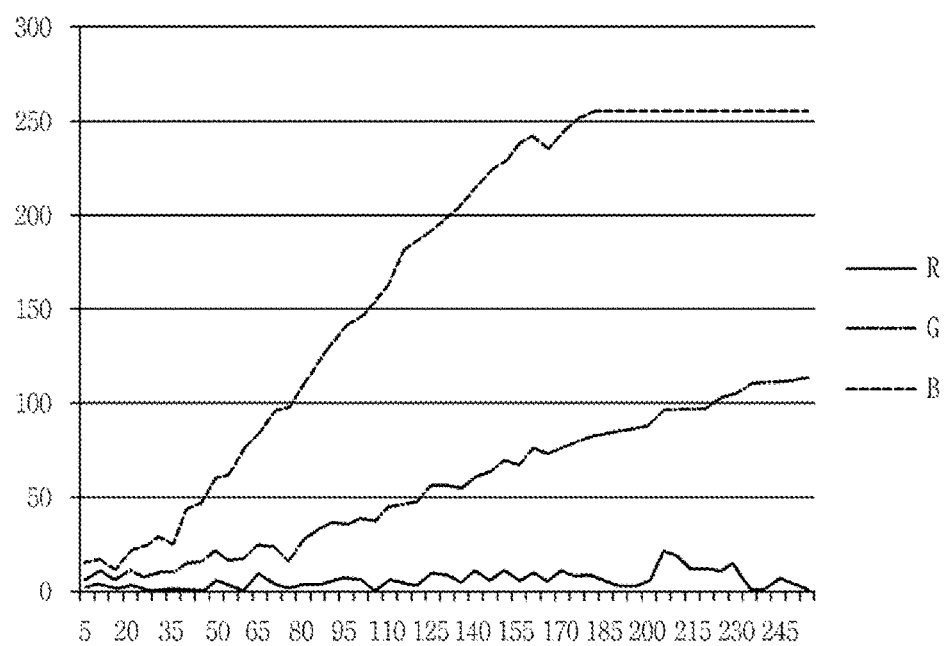

FIGS. 8A and 8B illustrate examples of results that a decoding device receiving an image code of blue (B) color obtains by analyzing red, green, blue (RGB) values according to distance. FIG. 8A shows an example where the distance between the display device 120 and the camera 131 is 45 cm, and FIG. 8B shows an example where the distance between the display device 120 and the camera 131 is 100 cm. FIGS. 8A and 8B show that the brightness value of G color linearly varies according to a change in the brightness value of B color. Therefore, in the experimental environment of FIGS. 8A and 8B, the code decoding device 130 may decode an image code based on G color. In the graphs of FIGS. 8A and 8B, horizontal axes denote brightness values output from the display device 120, and vertical axes denote brightness values that the code decoding device 130 determines by analyzing an acquired image.

Figure 9A:
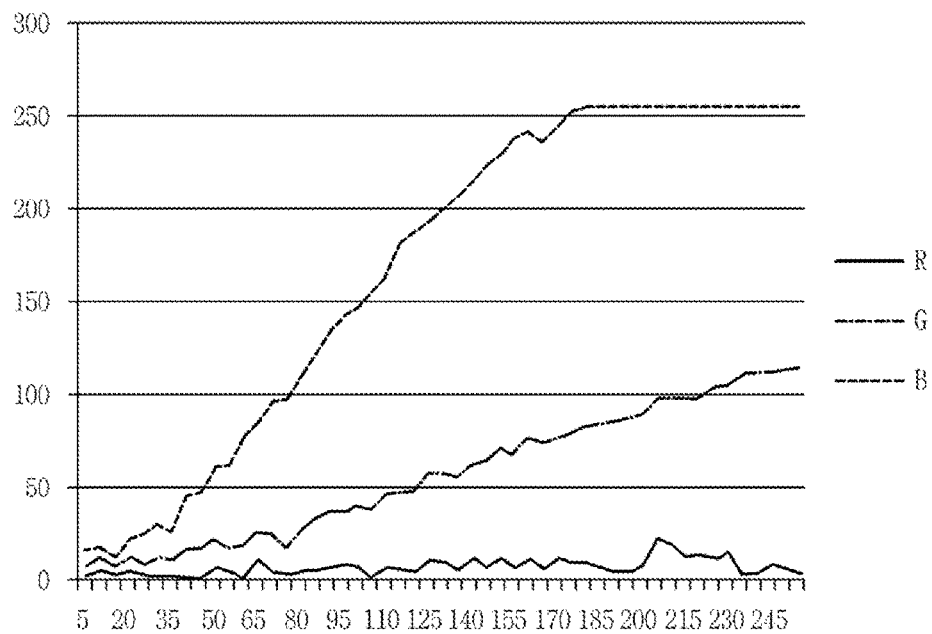
FIGS. 9A and 9B are diagrams illustrating examples of results that a decoding device receiving an image code of B color obtains by analyzing RGB values according to camera types.
Figure 9B:
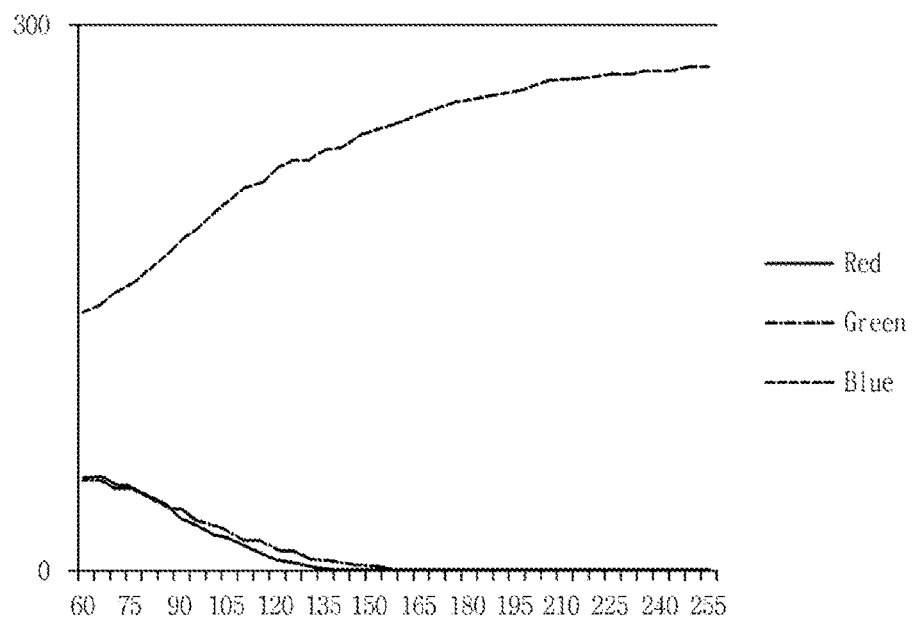

FIGS. 9A and 9B illustrates examples of results that a decoding device receiving an image code of B color obtains by analyzing RGB values according to camera types. FIG. 9A shows an example of acquiring an image code using a webcam of a PC, and FIG. 9B shows an example of acquiring an image code using a camera of a smart phone. In the graphs of FIGS. 9A and 9B, horizontal axes denote brightness values output from the display device 120, and vertical axes denote brightness values that the PC or the smart phone, which is the code decoding device 130, determines by analyzing an acquired image.

Referring to FIGS. 9A and 9B, when a camera of a smart phone is used, it is possible to know that B color is appropriate to be used in a decoding algorithm, unlike in the case of using a webcam of a PC. In FIG. 9B, only the brightness value of the B color linearly increases according to an actual distance.

As shown in the experimental result of FIGS. 9A and 9B, an appropriate color to be used in a decoding algorithm varies according to the code decoding device 130 and/or the camera 131, and thus it is preferable for the code decoding device 130 to determine a color for decoding.

For example, before starting communication, the display device 120 may output a color having brightness values of 5 to 255 at predetermined time periods, and the code decoding device 130 may acquire an image output from the display device 120 and analyze the image in the same way as described in FIGS. 9A and 9B. Then, the most appropriate color to be used in a decoding algorithm can be determined Using this method, source data may be transferred without a failure even when the display device 120 and/or the code decoding device 130 transferring the source data are replaced.

In addition, the code decoding device 130 may select an appropriate color model for code decoding among various color models for expressing a color image.

The code decoding device 130 analyzes brightness values of a color constituting an image code acquired through the camera 131, and determines a binary code corresponding to the brightness values, thereby decoding the image code. At this time, the code decoding device 130 may determine the brightness values of the color using at least one of the RGB model, the YCbCr model, and the YCgCo model.

Also, the code decoding device 130 may determine the brightness values of the color using at least one channel among the Cb channel of the YCbCr model, the Cr channel of the YCbCr model, the Cg channel of the YCgCo model, and the Co channel of the YCgCo model.

Further, the code decoding device 130 may determine the brightness values using at least one of currently existing various color models or using a model obtained by selectively combining some channels of color models.

In this process, the code decoding device 130 analyzes a sample image output from the display device 120, and selects a color model or a channel of a color model whose brightness values are most clearly distinguished from each other.

Figure 10:
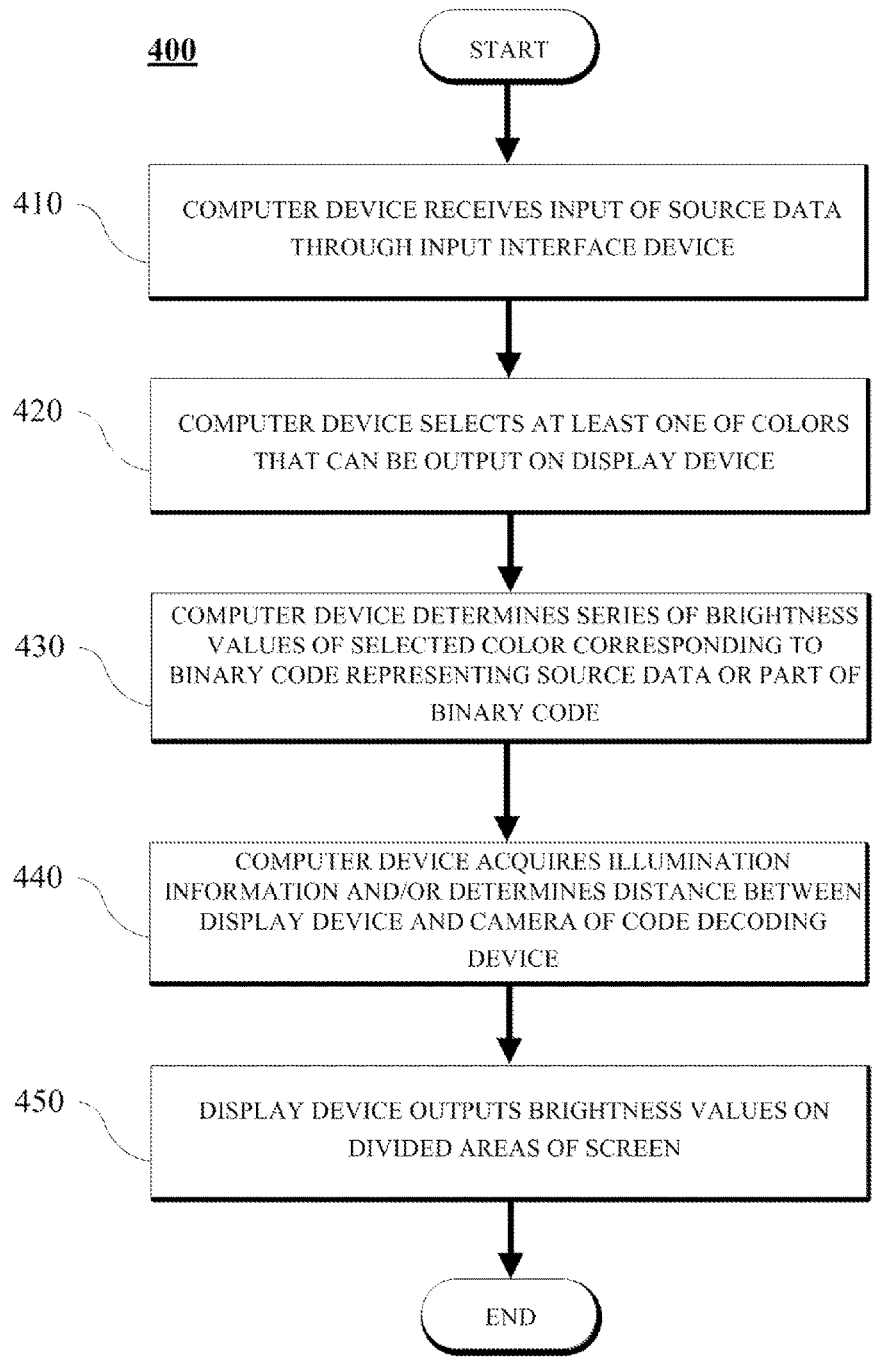
FIG. 10 is a diagram illustrating an example of method of outputting an image code on a display device.

FIG. 10 is a diagram illustrating an example of method 400 of outputting an image code on a display device. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. The above descriptions of FIGS. 1-9B, is also applicable to FIG. 10, and is incorporated herein by reference. Thus, the above description may not be repeated here.

In operation 410, an input of source data is received through an input interface device of a computer device. In operation 420, at least one of colors that can be output on the display device is selected by the computer device. In operation 430, a series of brightness values of the selected color corresponding to a binary code representing the source data or a part of the binary code is determined by the computer device. In operation 450, the selected color having the series of brightness values in a code area on a display panel of the display device in order of the series of brightness values is output by the computer device. Here, the computer device corresponds to the above-described code generation device 110.

The method 400 may further include operations 440 and 450. In operation 440, the sizes of code areas according to the distance between a camera capturing a screen of the display panel and the display panel is determined by the computer device. The computer device may determine the distance D using Equation 1 described above. In operation 450 of outputting the selected color, the size and the number of code areas according to the determined distance D may be adjusted.

Figure 11:
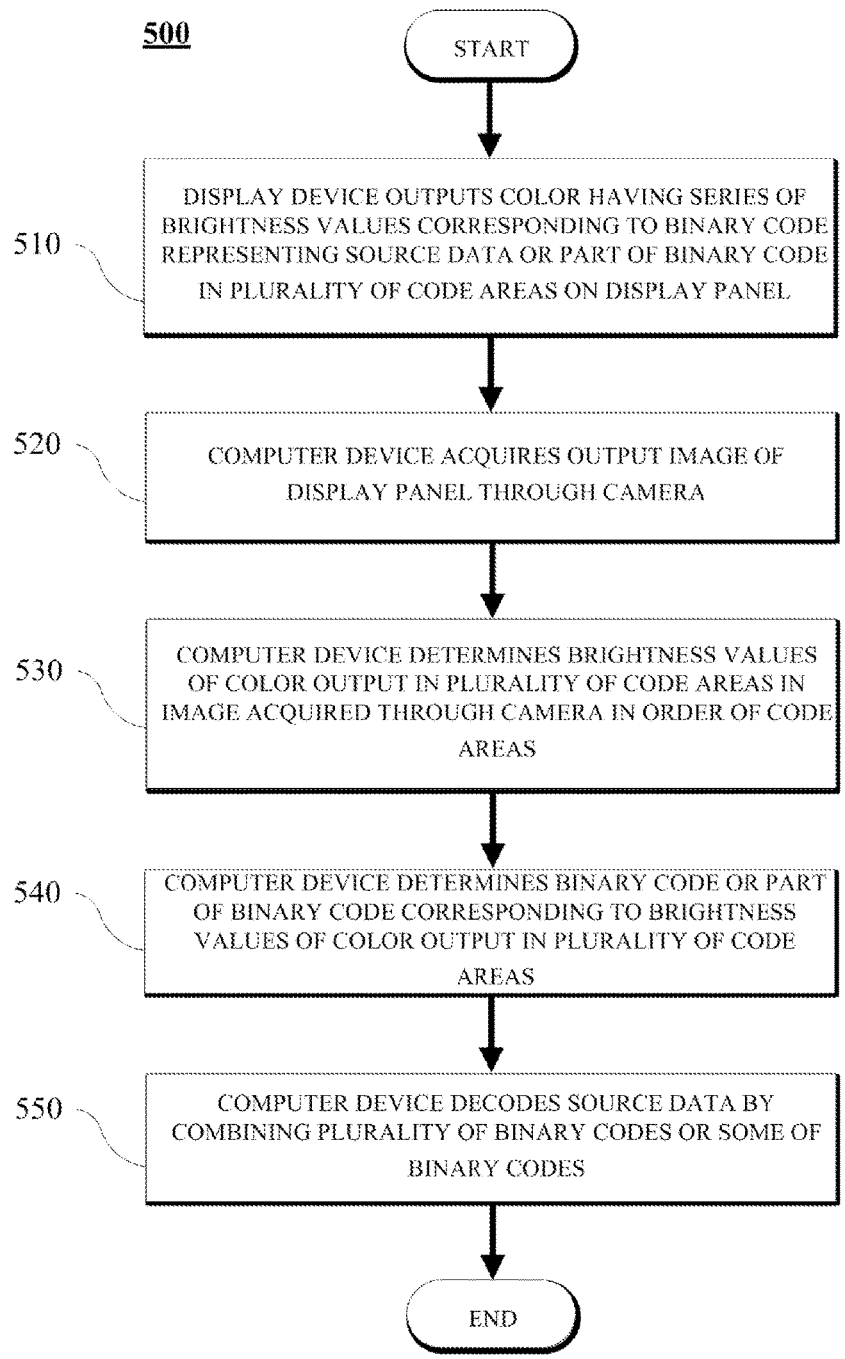
FIG. 11 is a diagram illustrating an example of method of decoding an image code.

FIG. 11 is a diagram illustrating an example of method 500 of decoding an image code. Here, a computer device corresponds to the above-described code decoding device 130. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. The above descriptions of FIGS. 1-10, is also applicable to FIG. 11, and is incorporated herein by reference. Thus, the above description may not be repeated here.

In operation 510, a color having a series of brightness values corresponding to a plurality of binary codes representing source data or some of the binary codes in a plurality of code areas is output on a display panel by a display device. In operation 520, an output image of the display panel is acquired through a camera of a computer device. In operation 530, brightness values of a color output from the plurality of code areas in the output image acquired through the camera in order of the plurality of code areas is determined by the computer device. In operation 540, the binary codes or the some of the binary codes corresponding to the brightness values of the color output in the plurality of code areas are determined by the computer device. In operation 550, the source data is decoded by the computer device by combining the plurality of binary codes or the some of the binary codes.

In the operation 510 of outputting the color, the display device may output a reference brightness value of the color in at least one of the plurality of code areas. In the operation 530 of determining the brightness values, the computer device may decode an image code by comparing the reference brightness value (the aforementioned comparative brightness value) acquired through a camera with a series of brightness values acquired through the camera.

In the operation 530 of determining the brightness values, the computer device may determine the brightness values of the color using at least one channel among the R, G, and B channels of the RGB model, the Cb and Cr channels of the YCbCr model, the Cg and Co channels of the YCgCo model. Further, the computer device may selectively select or combine various models that are not limited to the aforementioned color models, and determine the brightness values of the color.

Before the operation 510 of outputting the color, a sample image having different brightness values of a color may be output by the display device. In the operation 530 of determining the brightness values, the computer device may determine a color or a color model whose different brightness values are distinguished from each other by analyzing the sample image output from the display device, and may decode the image code based on the determined color or color model.

The computer device or the display device corresponding to a code generation device outputs an appointed sample image while increasing or reducing a brightness value within a range from 0 to 255, and the computer device corresponding to a code decoding device determines whether a decoding result identical to the appointed sample image is obtained. The sample image may be a plurality of frames whose brightness value is continuously changed, or include a plurality of frames having different brightness values.

Figure 12:
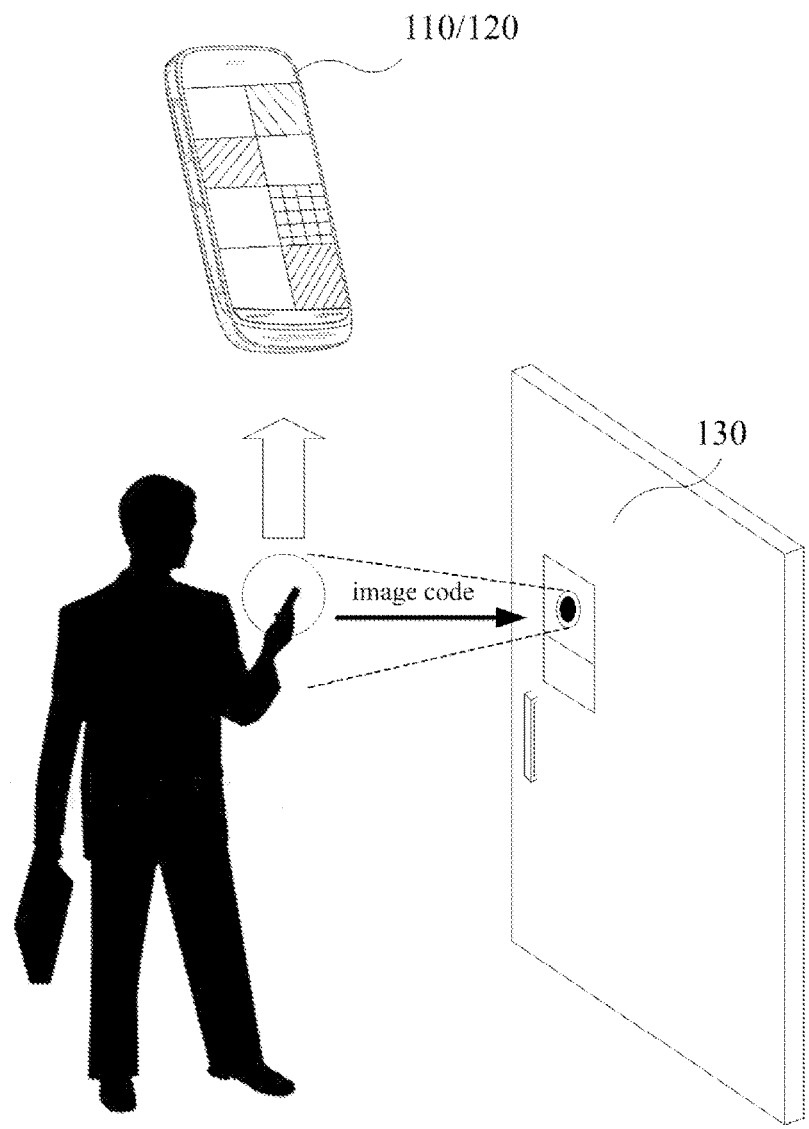
FIG. 12 is a diagram illustrating an example of a user authentication system using an image code.

The above-described system 100 for transferring data using an image code may be used as a user authentication system. FIG. 12 is a diagram illustrating an example of a user authentication system using an image code. The code generation device 110 and the display device 120 are implemented as a terminal such as a smart phone. A device built in a door is shown as the code decoding device 130.

At the door, a user inputs data for authentication or selects already-input data using the code generation device 110. Subsequently, the code generation device 110 generates an image code by encoding the input source data, and the display device 120 outputs the image code.

The code decoding device 130 decodes a series of brightness values acquired by a camera into the source data for authentication, and compares the decoded data with already-stored user authentication data. When there is user authentication data identical to the decoded authentication code data, the user is an authenticated user, and thus the door is opened.

Figure 13:
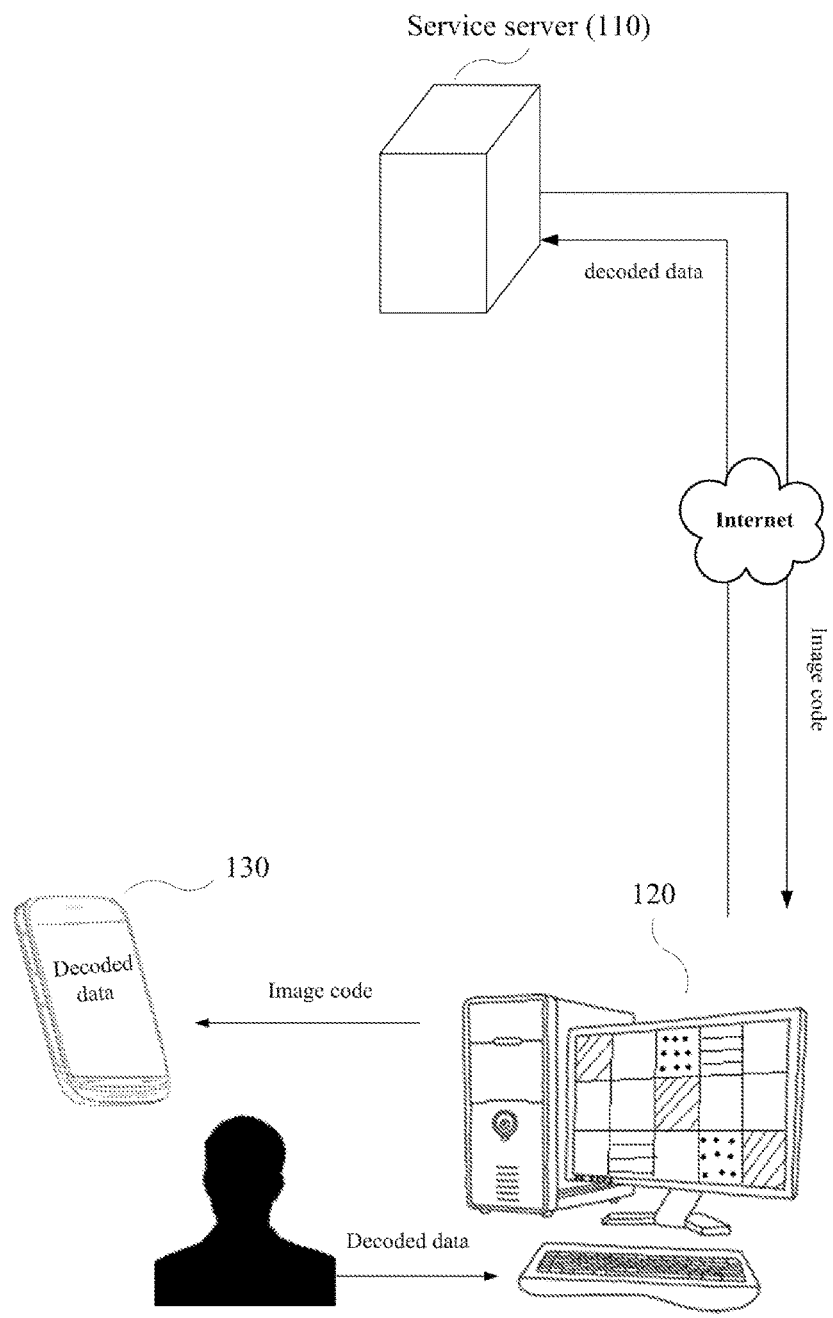
FIG. 13 is a diagram illustrating an example of a user authentication process using the Internet.

In another example, the system 100 for transferring data using an image code may be used for a user to access a specific web site using the Internet, or used for user authentication in a specific service. For example, the user currently intends to be provided with a specific service through his or her computer device. Then, user authentication may be performed during a login operation or a process of the specific service. FIG. 13 is a diagram illustrating an example of a user authentication process using the Internet. The code generation device 110 that is a server at a remote place generates an image code by encoding a source code to be used in authentication, and outputs the image code to the display device 120 of a user's computer device. The user may acquire the image code output on the display device 120 using the camera of a possessing terminal, such as a smart phone, and decode the source code using a dedicated application of the smart phone. Finally, the user may input the decoded data to the computer device and transfer the decoded data to the specific server, so that authentication may be performed. The specific server compares the decoded data with the source code that has been encoded into the image code by the specific server, thereby performing authentication.

Figure 14:
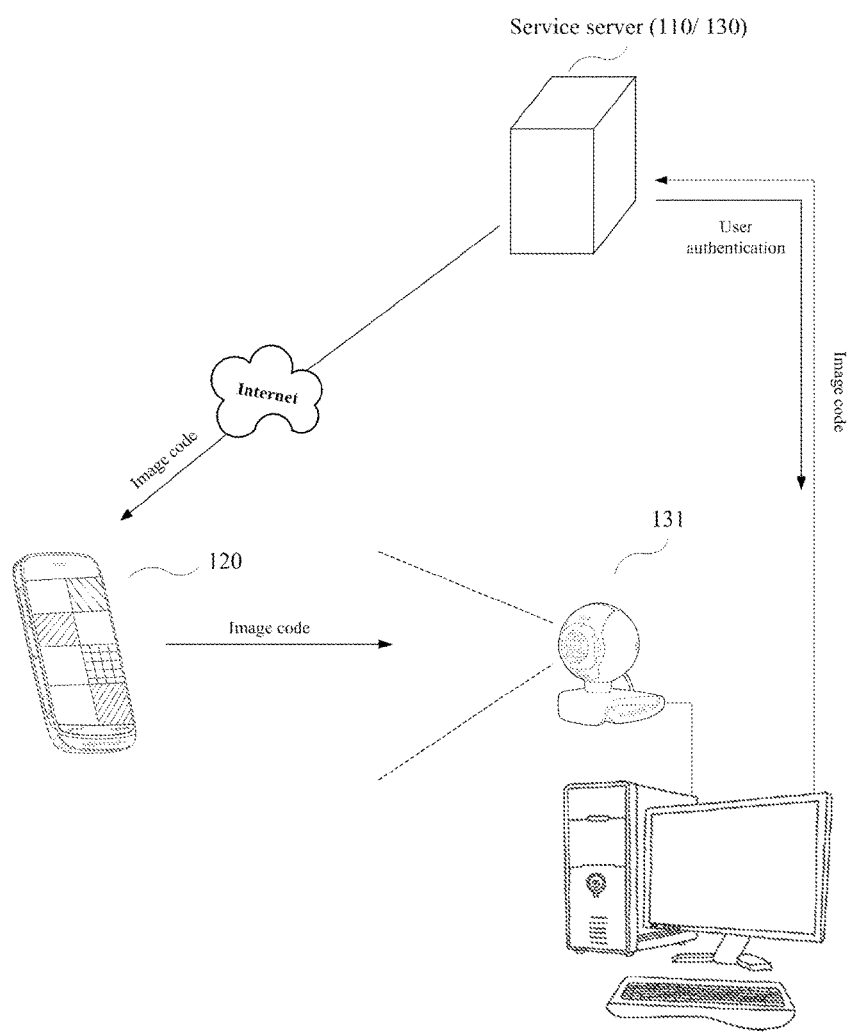
FIG. 14 is a diagram illustrating another example of a user authentication process using the Internet.

In another example, FIG. 14 is a diagram illustrating another example of a user authentication process using the Internet. For example, the code generation device 110, which is a server at a remote place, generates an image code by encoding a source code to be used in authentication, and transfers the image code to a user's terminal, such as a smart phone. The user may transfer the image code output on the display device 120 of the smart phone to the server through a webcam of a separate computer device. The webcam of the computer device corresponds to the camera 131 of the code decoding device 130. The server receiving the image code decodes the source code and compares whether the decoded source code is identical to the code transferred by the server itself. In this way, the server can confirm the specific user to whom the server has transmitted the image code. In this case, the server may correspond to both the code generation device 110 and the code decoding device 130. Otherwise, the code decoding device 130 may transfer the decoded source code to the service server, and the service server may perform user authentication.

Figure 15:
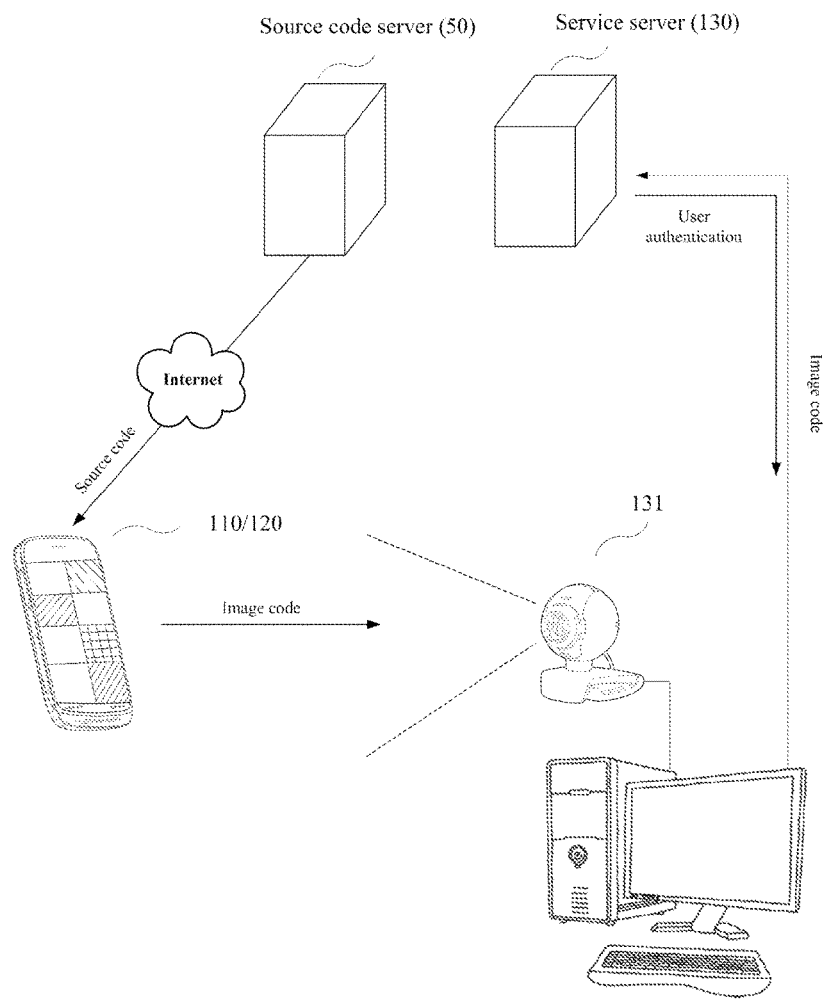
FIG. 15 is a diagram illustrating another example of a user authentication process using the Internet.

FIG. 15 is a diagram illustrating another example of a user authentication process using the Internet. For example, a server at a remote place transfers a source code for authentication to a user's smart phone corresponding to the code generation device 110. The smart phone generates an image code from the source code using a specific application and then outputs the image code on the display device 120. The user transfers the image code to the service server through a webcam of a separate computer device, and the service server corresponding to the code decoding device 130 may perform user authentication by decoding the image code. In this case, the webcam of the computer device corresponds to the camera 131 of the code decoding device 130.

The examples described above provide a system and method for transmitting and receiving data using a simple device, such as a portable terminal, in an environment in which it is not possible to use radio frequency (RF) communication.

In the examples described above, the size of an area in which a color having a series of brightness values is output is adjusted according to the distance between a display device and a camera of a decoding device, and thus it is possible to more efficiently and accurately transfer data.

In the examples described above, the brightness of an image output from a display device or the exposure of a camera lens is adjusted according to ambient illumination, and thus it is possible to accurately transfer data.

In the examples described above, a device for decoding data decodes an image output on a display device into the most appropriate model based on the surroundings or device characteristics among various color models, and thus it is possible to transfer data more accurately.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to transfer data, comprising:
a code generation device configured to generate a color and brightness output corresponding to a binary code of the data;
a display device configured to output colors having respective brightness values of respective code areas in a code region on the display panel together with a color having a reference brightness value of a reference area in a location on the display panel different than the code region, based on the color and brightness output; and
a code decoding device configured to capture an image of the display panel including the respective code areas and the reference area during the outputting, to determine the respective brightness values of the respective code areas in the image by comparing the reference brightness value of the reference area in the image with each of the respective brightness values of the respective code areas in the image, and to decode the determined brightness values based on a result of the comparing,
wherein the display device is further configured to adjust a number of the respective code areas, in response to detecting a change in a distance between the display device and a camera of the code decoding device,
wherein each of the determined brightness values corresponds to a respective part of the binary code,
wherein the capturing of the image of the display panel is performed by the camera, and the reference brightness value is either one of a maximum brightness value detectable by the camera and a minimum brightness value detectable by the camera, and
wherein the distance is determined based on a length of the display device or a part of the display device in a direction, a pixel length of an image of the display device or a part of the display device that corresponds to the length of the display device or the part of the display device in the direction in an image acquired through the camera, a pixel length of the image acquired through the camera in the direction, and a field of view of the camera.

2. The apparatus of claim 1,
wherein the code generation device comprises
an interface configured to accept the data,
a storage configured to store an encoding table comprising brightness values and a bit string corresponding to each of the brightness values in the encoding table, and
a processor configured to convert the data into the brightness values using the encoding table,
wherein the code decoding device comprises
a storage configured to store a decoding table comprising brightness values and a bit string corresponding to each of the brightness values in the decoding table, and
a processor configured to decode the determined brightness values using the decoding table.

3. The apparatus of claim 1, wherein the code areas do not overlap.

4. The apparatus of claim 1, wherein the data comprises any one or any combination of any two or more of text data, sound data, voice data, image data, and video data.

5. The apparatus of claim 1, wherein a size of the code areas is in proportion to a distance D between the display device and the camera.

6. The apparatus of claim 5, wherein the code decoding device is further configured to calculate the distance D using an equation below and to transfer the calculated distance D to the display device, or
the code generation device or the display device is further configured to receive image information acquired by the camera and to calculate the distance D using the equation below:

$$D = \frac{W_c}{W_r} \times \frac{W_p}{2 \times \tan(FOV/2)}$$

where $W_c$ is the length of the display device or the part of the display device in the direction, $W_r$ is the pixel length of the image of the display device or the part of the display device that corresponds to the $W_c$ in the image acquired through the camera, $W_p$ is the pixel length of the image acquired through the camera in the direction, and FOV is the field of view of the camera.

7. The apparatus of claim 1, wherein the code decoding device is further configured to determine the brightness values of the code areas in the image based on any one or any combination of any two or more of a red, green, blue (RGB) model, a YCbCr model, and a YCgCo model.

8. The apparatus of claim 7, wherein the code decoding device is further configured to determine the brightness values of the code areas in the image using at least one channel among Cb or Cr channels of the YCbCr model and Cg or Co channels of the YCgCo model.

9. The apparatus of claim 1, wherein the code generation device is further configured to generate the data for user authentication, and
the code decoding device is further configured to perform authentication based on a decoded data.

10. The apparatus of claim 1, further comprising a communication device configured to transfer decoded data, decoded by the code decoding device, to a remote server.

11. A method of outputting an image code on a display device, the method comprising:
receiving, by a computer device, an input of source data through an input interface device;
selecting, by the computer device, at least one color that can be output on the display device;

determining, by the computer device, brightness values corresponding to a binary code of the source data; and outputting, by the computer device, to the display device, colors having respective brightness values of respective code areas in a code region on the display device together with a color having a reference brightness value of a reference area in a location on the display device different than the code region, wherein the reference brightness value is used to determine brightness values of the respective code areas on the display panel, wherein a number of the respective code areas is adjusted, in response to detecting a change in a distance between the display panel and a camera capturing a screen of the display panel, wherein a start header indicating a start of an image code corresponding to the binary code is represented by at least one of the code areas having a start indication brightness value displayed at a first time, and an end header indicating an end of the image code is represented by at least one of the code areas having an end indication brightness value displayed at a second time, wherein the first time occurs before the second time, and wherein the distance is determined based on a length of the display device or a part of the display device in a direction, a pixel length of an image of the display device or a part of the display device that corresponds to the length of the display device or the part of the display device in the direction in an image acquired through the camera, a pixel length of the image acquired through the camera in the direction, and a field of view of the camera.

12. The method of claim 11, wherein a size of the code areas is determined according to a distance D between the display panel and the camera.

13. The method of claim 12, further comprising determining, by the computer device, a distance D using an image captured by the camera and an equation below:

$$D = \frac{W_c}{W_r} \times \frac{W_p}{2 \times \tan(FOV/2)}$$

where $W_c$ is the length of the display device or the part of the display device in the direction, $W_r$ is the pixel length of the image of the display device or the part of the display device that corresponds to the $W_c$ in the image acquired through the camera, $W_p$ is the pixel length of the image acquired through the camera in the direction, and FOV is the field of view of the camera.

14. A method of decoding an image code, the method comprising:

acquiring, by a computer device, an output image on a display panel through a camera, wherein the display panel is configured to output colors having respective brightness values of respective code areas in a code region on the display panel together with a color having a reference brightness value of a reference area in a location on the display panel different than the code region, and wherein the output colors and the respective brightness values correspond to a binary code of a source data in the respective code areas;

determining, by the computer device, the respective brightness values of the respective code areas in the image by comparing the reference brightness value of the reference area in the image with each of the respective brightness values of the respective code areas in the image, and decoding the determined brightness values based on a result of the comparing; and decoding, by the computer device, the source data based on the determined brightness values in the respective code areas, wherein a number of the respective code areas is adjusted, in response to detecting a change in a distance between the display panel and the camera, wherein each of the determined brightness values corresponds to a respective part of the binary code, wherein a start header indicating a start of an image code corresponding to the binary code is represented by at least one of the code areas having a start indication brightness value displayed at a first time, and an end header indicating an end of the image code is represented by at least one of the code areas having an end indication brightness value displayed at a second time, wherein the first time occurs before the second time, and wherein the distance is determined based on a length of the display device or a part of the display device in a direction, a pixel length of an image of the display device or a part of the display device that corresponds to the length of the display device or the part of the display device in the direction in an image acquired through the camera, a pixel length of the image acquired through the camera in the direction, and a field of view of the camera.

15. The method of claim 14, wherein the determining of the brightness values comprises determining, by the computer device, the brightness values of the color using at least one channel among of red, green, blue (RGB) channels of an RGB model, Cb and Cr channels of a YCbCr model, or Cg and Co channels of a YCgCo model.

16. The method of claim 14, further comprising outputting, by the display device, a sample image having different brightness values of the colors having the respective brightness values before the outputting of the colors having the respective brightness values, wherein the determining of the brightness values comprises analyzing, by the computer device, the sample image output from the display device and determining the brightness values based on a color whose different brightness values are distinguished from each other, or analyzing, by the computer device, the sample image output from the display device to determine a color model whose different brightness values are distinguished from each other and determine the brightness values using the determined color model.

17. A non-transitory computer-readable medium storing instructions that, when executed by one or more processors, cause the one or more processors to perform the method of claim 11.

18. A non-transitory computer-readable medium storing instructions that, when executed by one or more processors, cause the one or more processors to perform the method of claim 14.

19. An apparatus for transferring data, comprising:

a code generation device configured to generate an image code comprising a series of brightness values corresponding to a binary code and to process the image code to determine areas distinguished with brightness values;

a display device configured to output at least one color having the series of brightness values in a code area on a display panel; and a code decoding device configured to acquire the series of brightness values of the at least one color output in the code area through a sensor, and to decode the image code, wherein each of the at least one color corresponds to a number of digits of the binary code and each of the brightness values corresponds to an arrangement of the digits of the binary code, wherein a size of the code area is in inverse proportion to a distance D between the display device and the sensor, and wherein the code decoding device is further configured to calculate the distance D using an equation below and to transfer the calculated distance D to the display device, or the code generation device or the display device is further configured to receive image information acquired by the sensor and to calculate the distance D using the equation below:

$$D = \frac{W_c}{W_r} \times \frac{W_p}{2 \times \tan(FOV/2)}$$

where $W_c$ is an actual length of the display device or a part of the display device in one direction, $W_r$ is a pixel length of an image of the display device or the part of the display device corresponding to $W_c$ in an image acquired through the sensor, $W_p$ is a pixel length of the whole image acquired through the sensor in the same direction as the one direction, and FOV is a field of view of the sensor.

20. The apparatus of claim 1, wherein the binary code is an ASCII code.

21. The apparatus of claim 1, wherein the code decoding device is further configured to receive respective positions and respective sizes of the code areas before the determining of the respective brightness values.

22. The apparatus of claim 14, wherein the reference brightness value is either one of a maximum brightness value detectable by the camera and a minimum brightness value detectable by the camera.

23. The apparatus of claim 1, wherein
a start header indicating a start of an image code corresponding to the binary code is represented by at least one of the code areas having a start indication brightness value at a first time, and an end header indicating an end of the image code is represented by at least one of the code areas having an end indication brightness value at a second time, and
the first time occurs before the second time.

24. The apparatus of claim 1, wherein
the determined brightness values are decoded by generating bit strings which are respectively assigned to the determined brightness values, and
the bit strings are generated by respectively determining where the determined brightness values fall on a brightness range having a lower marginal brightness value and an upper marginal brightness value.

25. The apparatus of claim 24, wherein
the brightness range is divided into sections that each represent a unique bit string, and
each of the bit strings are of equal length.

26. The apparatus of claim 1, wherein the display device is further configured to increase a size of each of the respective code areas and decrease the total number of the respective code areas, in response to detecting an increase in the distance.

27. The apparatus of claim 1, wherein the reference area and at least a group of the respective code areas share a common color.

28. The apparatus of claim 1, wherein positions of the respective code areas automatically change over time.

* * * * *